June 21, 1966 G. W. LEHMANN 3,256,849
MANEUVER DEVICE FOR SUBMERGENCE VESSELS
Filed May 20, 1964 2 Sheets-Sheet 1

INVENTOR
GUENTHER WOLFGANG LEHMANN

BY *Erich M. H. Radde*

AGENT

June 21, 1966 G. W. LEHMANN 3,256,849
MANEUVER DEVICE FOR SUBMERGENCE VESSELS
Filed May 20, 1964 2 Sheets-Sheet 2

INVENTOR
GUENTHER WOLFGANG LEHMANN
BY Erich M. H. Radde
AGENT

United States Patent Office 3,256,849
Patented June 21, 1966

3,256,849
MANEUVER DEVICE FOR SUBMERGENCE VESSELS
Guenther Wolfgang Lehmann, 425 Bernardo Ave., Sunnyvale, Calif.
Filed May 20, 1964, Ser. No. 368,955
9 Claims. (Cl. 114—151)

Submergence vessels of the military, research, exploratory or commercial type proceed in a three-dimensional environment, be it the inner space or the outer space. Contrary to surface vessels which maneuver by conventional rudders or bow thrusters in a two-dimensional environment, submergence vessels require additional steering means for diving and rising, and to keep the submerged vessel on a prescribed course. Such maneuvers are usually performed by jet forces, by ballasting and by the hydrodynamical effect of steeringable planes, separately or in combination. Planes are hydrodynamically effective only at the presence of a flow motion, preferably when the vessel is in motion. This applies for both, surface vessels and submergence vessels at the presence of a fluid or gaseous medium. In order to improve the maneuverability of surface vessels, bow thrusters have been used which allow maneuvering of a vessel from a standstill. Maneuvering out of a standstill is likewise most desirable for submergence vessels.

Since submergence vessels are exposed to currents from any direction which may divert the vessel from its due course or may dislocate, for instance, a research vessel from her hovering observation position, a submergence vessel should be equipped with maneuver means featuring six degrees of freedom.

A maneuvering installation having six degrees of freedom has been proposed in my patent application Serial No. 355,057 filed March 26, 1964, and entitled, "Exploration and Salvage Submarine." Other maneuvering installations with a six degrees of freedom maneuver means are known, such as pitchcontrolled blades on rings rotating around and outside of the hull. In many instances, however, it is desirable to keep the hull smooth and free from appendages, protruding and rotating propeller blades, which may interfere with the job of a submergence vessel and may even jeopardize her safety.

It is the objective of the present invention to avoid the drawbacks of hitherto proposed six degrees of freedom maneuver means, and to simplify the design for saving weight, for easier operation and increased safety.

In order to produce forces and moments on a submerged vessel in six degrees of freedom it is proposed to provide a submergence vessel with thrusters at the bow and at the stern, each thruster consisting of a pair of ducts with one duct in horizontal position, as known from surface vessels, and the other duct in vertical position. Consequently, there are two independent ducts with two independent impellers at each end of the submergence vessel. The combined operation of the four impellers produces jet or thrust forces in such a manner that the resultant force of all jet forces traverses and rotates the vessel in any desired direction and plane, such motions can be superposed on the longitudinal motion of the vessel.

For simplification of the system it is furthermore proposed to provide at each end of the submergence vessel a duct system which is built in form of a cross with only one impeller. Such arrangement requires less space and only one impeller instead of two for each duct system, fore and aft.

A practical solution of the system wherein the centerlines of all four duct branches lie in the same transverse plane, consists of a sphere, the center of the sphere coinciding with the center of the duct cross. The four duct branches intersect the center sphere which has respective outcuts for flow passage. The sphere forming part of the shell of the duct system accommodates a second sphere carrying a motor which drives an impeller for producing a jet stream.

The second sphere is equipped with a tube of about the same diameter of the thrust ducts. The tube is rotatable within the second sphere and carries an impeller with its blades fixedly attached to the inside surface of the tube in the fashion of a shaftless propeller. The outside surface of the tube carries the rotor, the remaining space of the sphere is occupied by the stator and bearings for the rotatable part of the tube with the impeller.

In order to direct the flow of water to any duct of the duct cross, the second sphere is rotatable around its longitudinal axis. One bearing of the second sphere may be arranged outside the pressure hull, whereas the other bearing carries a shaft to the inside of the pressure hull where it engages a rotating mechanism. In this way only one side of the rotation means need be made water tight.

The waterflow to either of the four duct branches can be directed by selective rotation of the second sphere around 360° with the impeller running all the time in the same sense of rotation. A second method of directing the waterflow employs a rotation from only 0° to 90° with reversion of the sense of rotation of the impeller, for producing a jet stream in the desired direction.

Rotation of the second sphere may be accomplished by a simple gear and electromotor inside the pressure hull, by hydraulic means or by a quadrant of the same type as used in rudder installations of ships.

It is obvious that by rotating the impeller around an angle different from 0°, 90° and 180°, one part of the waterflow enters a horizontal and another part of the waterflow enters a vertical duct branch. The combined effect of these two thrusts, produced by the same impeller, is a resultant thrust force directed at a slant direction in a transverse plane. By proper adjustment of the second sphere of the bow and stern thrusters any desired maneuver can be performed in order to propel or to rotate the vessel in any direction, or to keep a submerged vessel at a standstill against currents from any direction.

The center portion of the duct cross system can be streamlined if the duct branches are shaped towards the center in form of a half-sphere of such a diameter that adjacent ducts meet the center of the cross duct at 45° points. In this way a sharp corner is avoided if the waterflow is directed under 45°.

It should be appreciated that the proposed six degrees of freedom maneuver system is doing away with rudders, sail planes and other appendages resulting in a smooth and unobstructed hull. All moving and rotating parts of the steering gear are inside the hull and well protected. This is a substantial improvement over customary rudders, sail planes or propeller blade rings of submergence vessels which are exposed to damages. A smooth hull is of particular importance for such submergence vessels which perform underwater work like salvage operations, underwater trawling or similar work where ropes and other gear may foul with rudders and with protruding propeller blades rotating around the periphery of a hull. A customary stern propeller may be protected by a ring or nozzle-like structure with brackets attached to the hull. Other advantages and features of the system will become more apparent when the description of a preferred embodiment of the invention proceeds in conjunction with the drawing, wherein:

Figure 1:
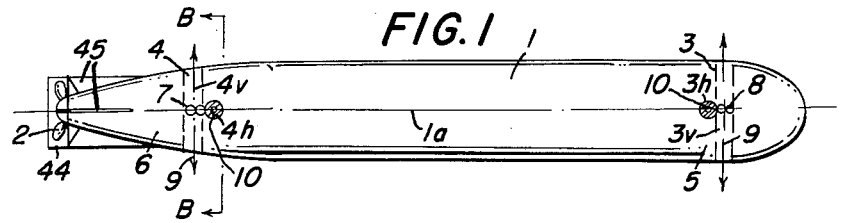
FIG. 1 is a profile of a submarine with two independent thrust ducts each at the fore and aft portion of the vessel and with customary impellers.

Referring now to the drawing and preferably to FIG. 1, there is a submarine hull 1, a propulsion unit 2, and two transverse thruster systems 3 and 4 at the forward body 5 and the aft body 6.

Each thruster has a duct 3v, 4v in the vertical transverse plane, and a duct 3h, 4h in the horizontal transverse plane, respectively. Ducts 3v, 3h and 4v, 4h are equipped with impellers 7 and 8. The axes 9 and 10 of the vertical and horizontal ducts lie in parallel transverse planes in upside down position, or, under 45° as indicated by 9' and 10'.

Figure 2:
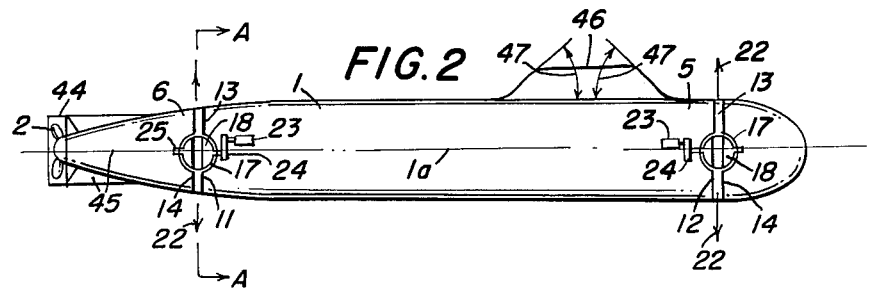
FIG. 2 is a profile of a submarine with a four-branch duct cross at the fore and aft portion of the vessel with duct impellers rotatably arranged at the center of the duct cross.

The transverse thruster systems 11 and 12 of FIG. 2 consist each of a duct cross where vertical and horizontal ducts 13, 14 and 15, 16 are arranged in the same transverse plane with a center sphere 17 in the longitudinal axis 1a of the submarine hull 1. The first center sphere 17 accommodates a second sphere-like body 18 which houses an impeller 19. The body 18, and consequently the impeller 19, is rotatable around bearings 20, 21 in the longitudinal axis 1a, so that a jet stream 22 may be directed either to the vertical duct branches 13, 14, or to the horizontal duct brances 15, 16.

Figure 3:
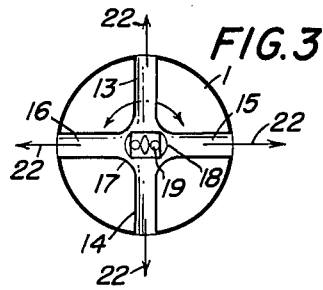
FIG. 3 is a cross section along line A—A of FIG. 2.
Figure 4:
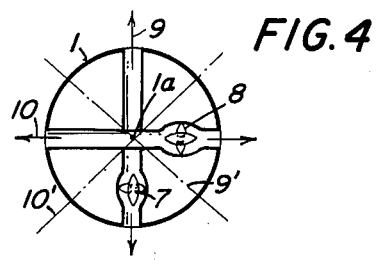
FIG. 4 is a cross section along line B—B of FIG. 1.
Figure 5:
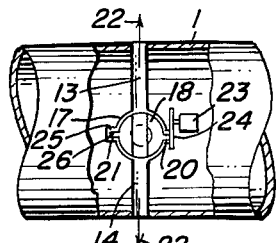
FIG. 5 is a typical thruster arrangement of FIG. 2.

As best illustrated in FIGURES 3 and 5, the body 18 is rotated by a motor 23 over a gear 24. It should be noted that the bearing 21 opposite the gear 24 is accommodated in a recess 25 attached to the center sphere 17, so that the shaft 26 does not protrude the pressure hull. In this way only one bearing has to be made tight against high water pressure. The body 18 with the impeller 19 may also be rotated by a customary rudder quadrant 27 if it is desired to limit the rotation of the impeller to 90°, and to produce water jets in either direction by reversing the sense of rotation of the impeller 19.

Figure 7:
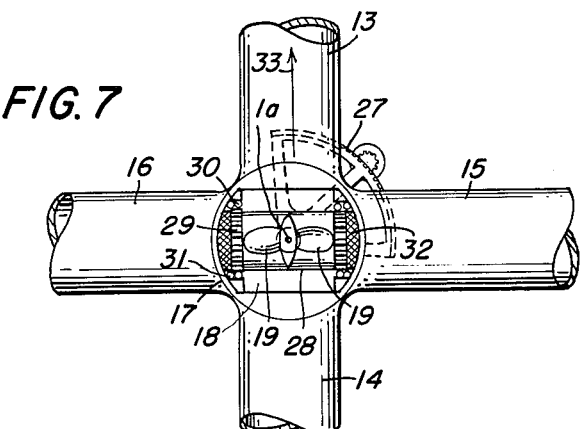
FIG. 7 is a cross section through a thruster system of FIG. 2 with a rotatable duct impeller and rudder quadrant rotating means.
Figure 8:
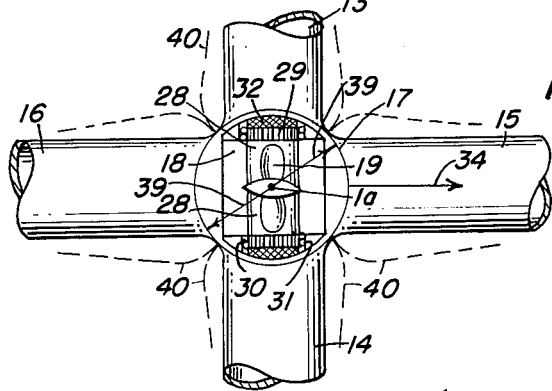
FIG. 8 is similar to FIG. 7 with the impeller duct in the centerline of the transverse duct.

FIG. 7 shows the thruster unit in more detail. The body 18 houses a rotatable tube 28 to which a shaftless impeller 19 is attached. The tube 28 carries at the outside a rotor 29, and is rotatably kept in position by bearings 30, 31. The stator 32 is fixedly attached to the body 18 which rotates around the longitudinal axis 1a. It should be appreciated that the diameter of the tube 28 conforms with the diameter of the duct system, so that a jet stream can be transported unobstructed from the suction to the pressure side of the thruster. FIG. 7 shows the impeller 19 in a fixed position producing a vertical jet flow 33, and in FIG. 8 a horizontal jet flow.

Figure 9:
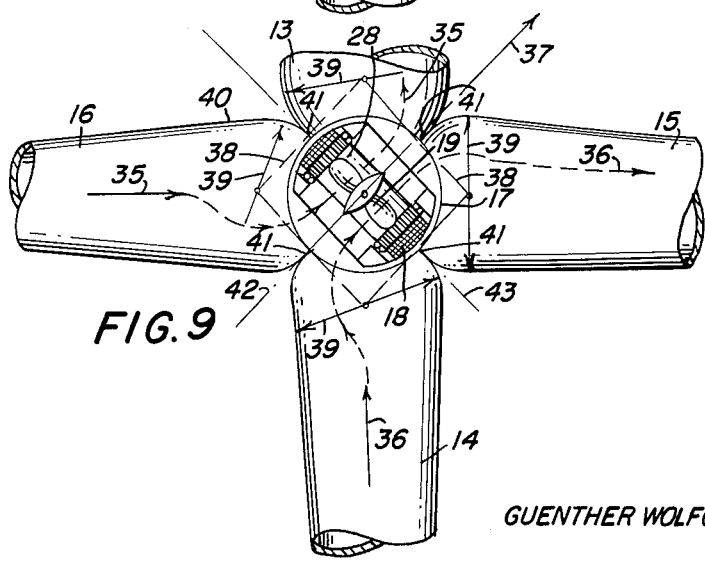
FIG. 9 shows a rotatable duct impeller of FIG. 2 under 45° adjustment relative to the axes of the four-branch duct cross.

In FIG. 9, the impeller 19 is adjusted in a position between 0° and 90°. It can be seen from FIG. 9 that the impeller 19 is suctioning from the vertical and the horizontal duct branches, and presses the water through the vertical and horizontal branches of the duct system, indicated by arrows 35, 36. This produces a resultant force 37, its direction and magnitude deepndent on the degree of rotation and the number of revolutions of the impeller 19.

In order to streamline the center duct for positions of the impeller between 0° and 90°, it is proposed to build the ducts at the center sphere 17 partly in form of a sphere with the same radius of the sphere 17 from points of intersections between a 45° square 38 with sidelengths of the diameter 39 of the sphere 17 resulting in boundaries 40 of the duct branches of the duct cross with intersections 41 at 45° lines 42, 43, thus dividing and guiding the jet stream in hydrodynamical efficient manner to the duct branches of the thruster.

Figure 6:
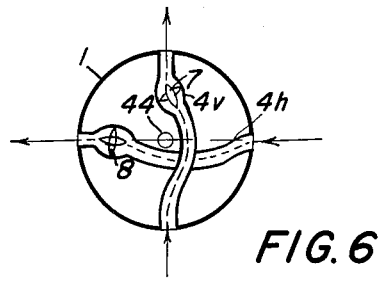
FIG. 6 is a cross section through a duct cross thruster of FIG. 1 with ducts bypasing a propeller shaft.

As best illustrated in FIG. 6, the ducts, preferably those at the aft body of a vessel, may be arranged eccentrically at the presence of a shaft 44 or other basic ship structures which may prevent a straight duct system.

The propeller 2 can be protected by a ring 44 held in position by brackets 45 which serve at the same time as course stabilizing fins at the absence of rudder and sail planes. Ropes, for instance, can slide along the submerged hull and pass the brackets 45 without fouling with the propeller 2. The hull of the submarine is completely smooth. A conning tower 46 may also be specially shaped in such a way that the entrance angles 47 provide sufficient smoothness for guiding ropes and other obstacles along the hull in either direction. Smoothness of the hull is in particular desirable in a submarine designed for underwater salvage work and underwater trawling where gear and ropes may entangle with appendages of a submarine, jeopardizing the safety of crew and ship.

From the operational viewpoint it should be mentioned that at the presence of two four-branch duct crosses, one at the forebody, the second at the aft-body, as illustrated in FIG. 2, forces can be produced which traverse the submarine in any longitudinal plane, i.e., in the longitudinal vertical/horizontal plane or any plane inbetween, and to rotate the submarine around the transverse vertical or horizontal axis or around any other transverse axis inbetween. Rotation and translation may be produced separately or concurrently. While the submarine is cruising or trawling, the vessel is propelled by the propulsion units. The four-branch duct cross thrusters fore and aft keep the vessel on due course, and raise or lower the vessel as desired. For this purpose the impeller of one of the two duct cross thrusters is adjusted to produce a horizontal jet stream in either direction for keeping or changing the course, and the impeller of the second duct cross thruster is adjusted for producing a vertical jet stream which raises or lowers the vessel while the vessel proceeds ahead or astern.

It is understood that, for matter of convenience, ducts in the drawing are shown in form of cylinders, and consequently, the intersecting bodies at the center of a duct cross are spheres. It is also possible to build the ducts and duct branches of any other cross-section, such as hexagonal or square sections. The intersections of square sectional branches with the centerbody becomes then part of cylinders instead of spheres, and the second sphere, accommodating the impeller, becomes then a cylinder also.

It is understood that the thruster system as described is not confined to water as a three-dimensional environment, but may also advantageously be used in vehicles which travel in space at the presense of absence of surrounding gaseous or other environmental media.

It is further understood that the thruster system as described is not confined to a vessel having a distinguished axis, such as the longitudinal axis of a submarine, but may be incorporated also in vessels of any shape travelling in a three-dimensional environment.

The duct cross may also be arranged with its main axes under 45° in the transverse plane of the vessel. Such arrangement is advisable in cases where tubes for shooting a net for underwater trawling occupy the upper or lower space of a bow or stern in the longitudinal vertical center plane of a submergence trawler. In case of bent ducts, the last portion of the duct at the entrance or exit should intersect the hull perpendicularly. It is also understood that at the absence of a medium, thrust forces may be produced by gaseous jets supplied by the vehicle and directed through the described duct system. The tube 28 serves then as a jet directing means.

While the invention has been described in connection with a single embodiment, it will be obvious that many changes and modifications in structural details may occur to those skilled in the art, particularly after benefiting from the present teaching, without departing from the spirit and scope of the invention as defined in the appended claims.

I claim:
1. A maneuvering device for a submergence vessel a hull, comprising a thruster including four duct branches extending inwardly of the hull, the duct branches forming a cross duct system with pairs of the branches in two respective planes, the cross duct system defining a central chamber with a curvilinear boundary, a body with a correspondingly curvilinear boundary mounted rotatably in said central chamber, a rotatable duct part within said body, an impeller and a rotor carried by said body, a stator fixedly attached to said body and surrounding the rotor, bearing means extending in a longitudinal direction of the submergence vessel, said bearing means being mounted in said chamber and supporting said body, and rotating means for the body arranged outside the central chamber and inside the hull.

2. The device of claim 1, wherein the chamber and body are spherical.

3. The device of claim 1, wherein the chamber and body are cylindrical.

4. The device of claim 1, one of said thrusters being arranged at a respective end of the submergence vessel.

5. The device of claim 1, wherein the bearing means is placed in a recess of the chamber, said recess forming part of the hull of the submergence vessel.

6. The device of claim 1, wherein the parts of said four duct branches adjacent the central chamber are parts of a sphere or cylinder with intersecting faces at about 45° at the duct cross center.

7. The device of claim 1, where the center of the duct cross coincides with the longitudinal axis of the submergence vessel.

8. A maneuvering device for a submergence vessel having a hull, comprising a thruster including four duct branches extending inwardly of the hull, the duct branches forming a cross duct system with a pair of the branches being bent, two branches of the duct system defining respective chambers with a curvilinear boundary, a body with a correspondingly curvilinear boundary mounted rotatably in each of said chambers, a rotatable duct part within each body, an impeller and a rotor carried by each body, a stator fixedly attached to each body and surrounding the rotor, bearing means extending in the respective longitudinal directions of said two branches, said bearing means being mounted in respective ones of said chambers and supporting a respective one of said bodies, and rotating means for said bodies arranged outside said chambers and inside the hull.

9. The device of claim 8, wherein portions of respective pairs of said duct branches adjacent the hull are in line with each other, the axes of said duct branch portions being perpendicular to each other.

References Cited by the Examiner
UNITED STATES PATENTS
2,330,674  9/1943  Briggs _____ 114—151

FOREIGN PATENTS
445,699  4/1936  Great Britain.

MILTON BUCHLER, *Primary Examiner.*
ANDREW H. FARRELL, *Examiner.*